United States Patent
Trott et al.

(10) Patent No.: US 8,542,267 B1
(45) Date of Patent: Sep. 24, 2013

(54) CALIBRATING A VISUAL-COLLABORATIVE SYSTEM

(75) Inventors: Mitchell Trott, San Mateo, CA (US); Kar-Han Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 698 days.

(21) Appl. No.: 12/571,529

(22) Filed: Oct. 1, 2009

(51) Int. Cl.
*H04N 15/00* (2006.01)

(52) U.S. Cl.
USPC ............... 348/42; 348/50; 345/419; 352/57; 382/154

(58) Field of Classification Search
USPC ......... 348/42, 50, 51, 52, 744, 745; 345/419; 382/154; 352/57, 178, 198, 203, 81; 600/429
See application file for complete search history.

(56) References Cited

U.S. PATENT DOCUMENTS

| | | | |
|---|---|---|---|
| 7,714,895 B2 * | 5/2010 | Pretlove et al. | 348/211.2 |
| 2005/0129325 A1 * | 6/2005 | Wu | 382/254 |
| 2005/0180631 A1 * | 8/2005 | Zhang et al. | 382/173 |
| 2005/0264527 A1 * | 12/2005 | Lin | 345/156 |
| 2008/0144925 A1 * | 6/2008 | Zhu et al. | 382/154 |
| 2009/0115915 A1 * | 5/2009 | Steinberg et al. | 348/745 |

OTHER PUBLICATIONS

Lee, Johnny C., et al., "Automatic Projector Calibration with Embedded Light Sensors", *UIST 2004*, (Apr. 2004),6 pages.

Tan, Kar-Han et al., "ConnectBoard: A Remote Collaboration System that Supports Gaze-Aware Interaction and Sharing", *MMSP'09*, Oct. 5-7, 2009, Rio de Janeiro, Brazil, 2009 IEEE, 6 pages.

USPTO U.S. Appl. No. 12/432,550, "Systems for Capturing Images Through a Display", filed Apr. 29, 2009, 35 pages.

* cited by examiner

*Primary Examiner* — Frantz Jean

(57) ABSTRACT

A calibration system including a display screen having a first surface and a second surface and a projector configured to project an image onto the first surface of the display screen and the image is viewable on the second surface of said display screen, wherein the projector includes a projector coordinate system. The calibration system also includes a camera configured to capture an image of an object through the display screen, where the camera comprises a camera coordinate system, and a calibration device configured to calibrate the display screen.

19 Claims, 2 Drawing Sheets

CALIBRATING A VISUAL-COLLABORATIVE SYSTEM

FIELD

Embodiments of the present technology relates generally to the field of remote collaborative systems.

BACKGROUND

Typically, remote visual-collaborative systems cooperatively use subsystems such as a camera, a projector and a display screen to project, receive, send and/or display images. Optionally, a touch system can be cooperatively used. Accordingly, it is ideal to calibrate or bring the camera, projector, display and/or touch system into correspondence.

Calibration methods that rely wholly on static parameters (e.g., geometry or pre-calibrated components) are often used to calibrate the collaborative system. However, if the system breaks and/or repairs are made, the geometry of the system may change and subsequently change the calibration. Moreover, calibration is substantially more complex if the camera is designed not to capture images projected from the projector.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Embodiments of the present invention are directed to visual-collaborative systems. Typically, visual-collaborative systems enable geographically distributed groups or individuals to engage in face-to-face, interactive collaborative video communication. It should be appreciated that a visual-collaborative system includes: one camera at any location that is compatible to capture images (e.g. images of a user and/or associated objects) to be transmitted to a corresponding remote visual-collaborative system and a display screen configured to display images captured at a remote location and transmitted to a local visual-collaborative system.

Specific examples will follow in which visual-collaborative systems include a camera that captures images through a display screen. It will be understood, as stated above, that other visual-collaborative systems can include cameras at any compatible location, however, for the purposes of brevity and clarity, examples of visual-collaborative systems will be used that capture images through a display screen.

In one embodiment, the system includes a projection display screen that enables cameras to capture images of the local objects through the display screen and send the images to a remote site. In addition, the display screen can be used to simultaneously display images from the remote site. Optionally, the systems include a touch sensing system.

Visual-Collaborative Systems

Figure 1:
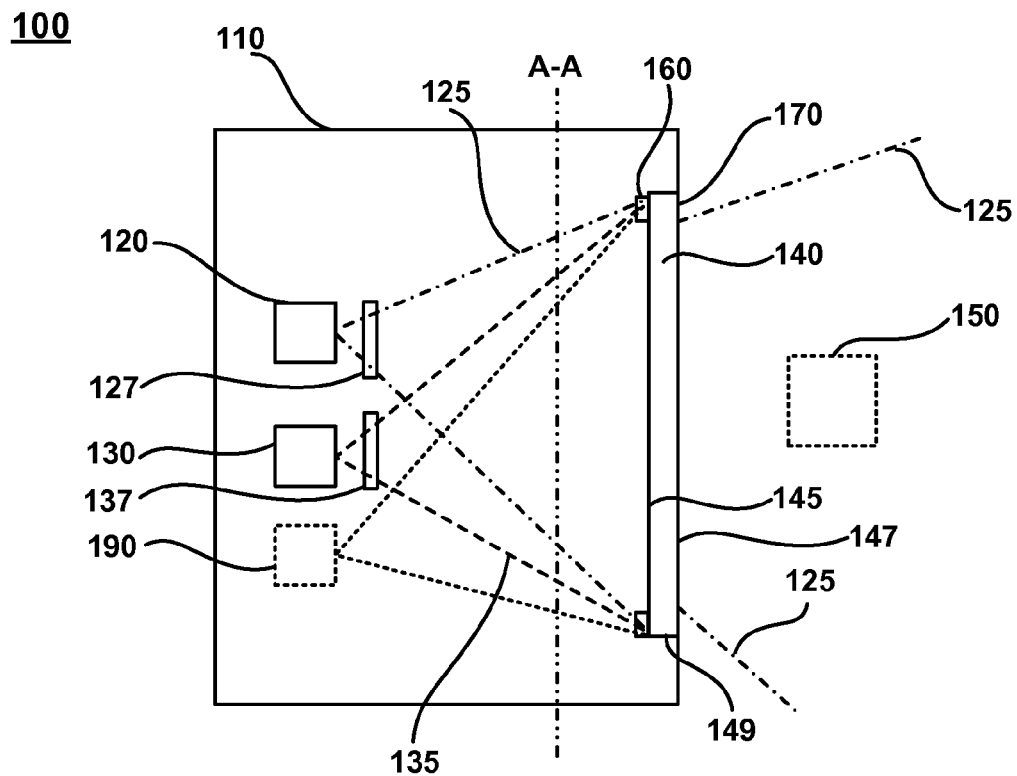
FIG. 1 illustrates an example of an endpoint of a visual-collaborative system, in accordance with an embodiment of the present invention.
Figure 1:
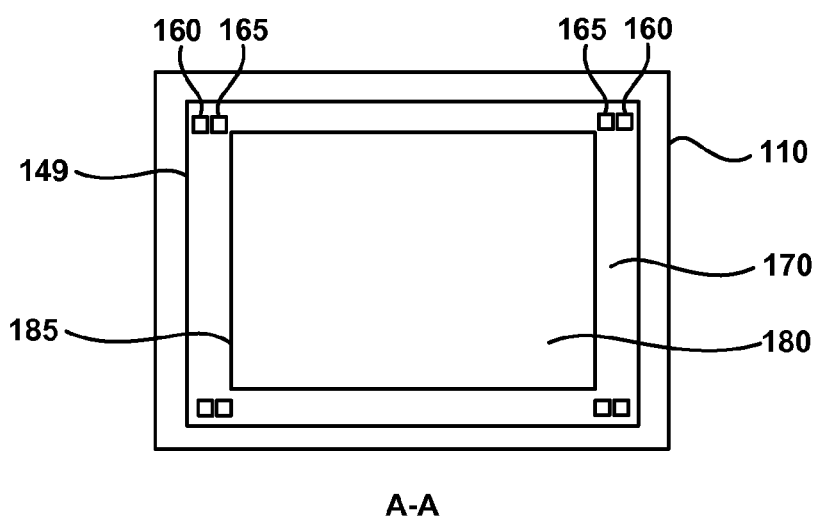

FIG. 1 shows a schematic representation of a visual-collaborative system 100 configured in accordance with embodiments of the present invention. The system 100 comprises a display screen 140, a camera 120, and a projector 130 and includes a filter A or 127 disposed between the camera lens (not shown) and the screen 140 and a filter B or 137 disposed between the projector lens (not shown) and the screen 140. The camera lens and projector lens (not shown) are positioned to face the same first surface 145 of the display screen 140. In one embodiment, the screen 140 is a rear projection display screen. However, the rear projection implementation shown is for purposes of example only and the screen 140 may also be a front projection display screen. It should be appreciated that during operation, system 100 is one of a plurality of other systems that are visually collaborating with one another. The plurality of systems, as a whole, are also referred to as a visual-collaborative system.

Referring to FIG. 1, the screen 140 is a rear projection display screen comprising a screen material that diffuses light striking the first surface 145 within a first range of angles. The projector 130 is positioned to project images onto the first surface 145 within the first range of angles. A viewer (not shown) facing the outer second surface 147 of the screen 140 sees the images projected onto the screen 140 from the projector 130. The screen 140 is also configured to transmit light scattered from an object(s) 150 facing the second surface 147. In other words, the camera lens is positioned to face the first surface 145 so that light scattered off of object(s) 150 facing the second surface 147 passes through the display screen and is captured as images of the objects by the camera 120. It should be appreciated that a viewer can be represented as an object 150.

In certain embodiments, the display screen 140 comprises a relatively low concentration of diffusing particles embedded within a transparent screen medium. The low concentration of diffusing particles allows a camera 120 to capture an image through the screen (providing the subject is well lit), while diffusing enough of the light from the projector 130 to form an image on the screen. In other embodiments, the display screen 140 can be a holographic film that has been configured to accept light from the projector 130 within a first range of angles and transmit light that is visible to a viewer within a different range of viewing angles. The holographic film is otherwise transparent. In both embodiments, light projected onto the first surface 145 within the first range of angles can be observed by viewing the second surface 147, but light striking the second surface 147 is transmitted through the screen 140 to the camera. However, in both embodiments the camera 120 also captures light from the projector 130 diffused or scattered off the first surface 145.

In order to prevent ambient light from striking the first surface 145 of the screen 140 and reducing the contrast of the projected and captured images, the system 100 may also include a housing 110 enclosing the camera 120 and projector 130. The housing 110 is configured with an opening enclosing the boundaries of the screen 140 and is configured so that light can only enter and exit the housing 110 through the screen 140.

Filters A and B are configured to prevent light produced by the projector and scattered or diffused from the screen 140 from interfering with light transmitted through the screen 140 and captured by the camera 120. In the embodiment previously described, this is accomplished using a first type of filter, a polarized filter. However, other types of filters may be used. In an alternative embodiment, this can be achieved using a second type of filter, a wavelength division filter. In particular, filter B can be configured to transmit a first set of wavelengths ranges that when combined create the visual sensation of a full range of colors in projecting images on the display screen 140, and filter A can be configured to transmit a second set of wavelength ranges that are different from the first set of wavelength ranges. The second set of wavelength ranges can also be used to create the visual sensation of a much broader range of colors. In other words, filter A is configured and positioned to block the wavelength ranges that are used to create images on the display screen 140 from entering the camera lens. Even though the wavelength ranges used to produce images viewed by the viewer are different from the wavelengths of light used to capture images by the camera 120, the projector 130 can still use the colors transmitted through filter B to project full color images and light transmitted through filter A and captured by the camera 120 can still be used to record and send full color images. It is the component wavelengths of the light used to project and capture the full color images that are prevented from interfering. Similar to the descriptions with respect to polarized filters, wavelength division filters may not completely be non-overlapping so that a filter may substantially block a set of wavelength ranges.

Visual-collaborative system 100 can include a touch sensing system. In one embodiment, a touch sensing system includes a touch camera 190 configured to sense the area of contact on display screen 140. For example, display screen 140 includes infrared (IR) light that is bouncing around inside the display screen. If pressure is applied to the display screen, by a user touching the screen at point xs, the IR light is "frustrated" in the region of xs and the frustrated IR light is emitted outside of the display screen 140 in the region of xs. Touch camera 190 captures the frustrated IR light and, accordingly, senses the region of contact xs.

In another embodiment, a touch sensing system includes a pressure sensitive film (not shown) that is applied to the second surface 147 of display screen 140. If pressure is applied to the display screen at a point xs then a touch at point xs is registered by the pressure sensitive film.

Calibration of Sub-Systems

Visual-collaborative system 100 is also configured to calibrate the included sub-systems. Calibration refers to the process of determining how to bring the subsystems (e.g., screen, projector, camera, touch sensor) into correspondence. In one embodiment, calibration provides a transformation that maps one sub-system with another sub-system or a plurality of other sub-systems. For instance, a calibration can provide a transformation that relates a coordinate system of one sub-system with a coordinate system of another coordinate sub-system. In another embodiment, the transformation is a homography.

After calibration, the two systems can be interconnected in such as way as to provide an illusion of touching a common surface at a common point. The illusion is not automatic from calibration. The systems are set up to use the calibration information, and a projector of one system must project the images captured from the other system and vice versa.

For example, if User 1, using visual-collaborative system 1, were to touch Screen 1 at point $X_1$, then User 2 would see User 1's finger tip pointing at Screen 2 of visual-collaborative system 2, at a corresponding point $X_2$ on Screen 2. If User 2 were to touch Screen 2 at point $X_2$ (to touch the finger tip of User 1), then User 1 should see User 2's finger tip touching User 1's fingertip, if there is proper calibration. On the other hand, if there is incorrect calibration, User 1 may see User 2's finger tip touching at a point different than point $X_1$ on Screen 1, even though User 2 is touching point $X_2$ (location of User 1's fingertip) on Screen 2.

In reference to FIG. 1, view A-A (a cross-section of visual-collaborative system 100) illustrates camera calibration devices 160 and projector calibration devices 165 configured to calibrate camera 120 and projector 130. View A-A depicts a view looking from inside housing 110 towards the outside of housing 110 in the direction of display screen 140.

Camera 120 has an image capture view 125. In one embodiment, the image capture view 125 corresponds with the peripheral edge 149 of display screen 140. For example, any objects outside of the image capture view 125 cannot be captured by the camera 120. Only images of objects (e.g. 150) located within the image capture view 125 can be captured by camera 120.

Visual-collaborative system 100 can also include a bezel 170. Bezel 170 is configured to at least house display screen 140. Bezel 170, which is opaque, can cover a peripheral portion of display screen 140, such that the peripheral portion of the display screen 140 overlaps with bezel 170. Accordingly, bezel 170 can block a portion of the image capture view 125.

Camera calibration devices 160 can be disposed behind the bezel 170 and proximate to first surface 145, such that camera calibration devices 160 are not viewable from the second surface 147 of the display screen. In various embodiments, the camera calibration devices 160 are light sources. The light sources can be but are not limited to light emitting diodes (LEDs), organic-light emitting diodes (OLEDs), neon tubes, incandescent bulbs and the like. The color of the light emitted by the camera calibration devices 160 are within the spectral sensitivity range of camera 120 (inclusive of any filters). FIG. 1, view A-A, depicts four camera calibration devices 160, however, in various embodiments visual-collaborative system 100 includes at least one camera calibration device.

Camera calibration devices 160 have known coordinates relative to surface 145. For example, the four camera calibration devices depicted in FIG. 1 have known coordinates $xs_1$, $xs_2$, $xs_3$ and $xs_4$, respectively, relative to surface 145. If system 100 included only one camera calibration device 160, then the single calibration device would have a known coordinate $xs_1$ relative to surface 145.

Camera calibration devices 160 emit light towards camera 120 from the known coordinates (e.g., $xs_1$, $xs_2$, $xs_3$ and $xs_4$, respectively). Camera 120 captures the emitted light from each camera calibration device at respective pixel locations (e.g., $xp_1$, $xp_2$, $xp_3$ and $xp_4$, respectively). For example, light emitted at $xs_1$ is captured at pixel location $xp_1$, light emitted at $xs_2$ is captured at pixel location $xp_2$, light emitted at $xs_3$ is captured at pixel location $xp_3$, and light emitted at $xs_4$ is captured at pixel location $xp_4$. Thus, by knowing the coordinates of the camera calibration devices 160 relative to surface 145, the coordinate system of the display screen 140 can be calibrated by a transformation Hcs, where "c" is in reference to the camera and "s" is in reference to the display screen 140.

Homography can be determined from a set of four sample points. For example, to determine Hcs (as described above), it is sufficient to know four pairs of corresponding points (e.g., (xs, xc)). More points can provide for a more accurate calibration via, for example, a least squares optimization. Fewer points can be utilized if there is a known approximate transformation (e.g., determined at manufacturing) and it is desired only to refine the approximate transformation to be more accurate.

In another embodiment, camera calibration devices 160 (e.g., LEDs) are different colors. The different colored camera calibration devices can determine if camera 120 is installed in the correct orientation. If the camera is in the wrong orientation (e.g., flipped), viewing the different colored camera calibration devices can determine that the camera is flipped. Accordingly, a homography can be used to correct for the flipped camera. In a further embodiment, labels with a unique pattern are disposed adjacent the camera calibration devices, where the pattern differs for each camera calibration device. The labels are configured to facilitate camera 120 to read the proper camera calibration device and, for example, to correct for a flipped camera. The ambient light emitted by the camera calibration devices can be sufficient light for the camera to capture the image of the labels.

Projector calibration devices 165 are configured to calibrate projector 130, as stated above. In one embodiment, projector calibration devices 165 are disposed behind the bezel 170 and proximate to first surface 145, such that projector calibration devices 165 are not viewable from the second surface 147 of the display screen 140. Projector calibration devices 165 are disposed in locations that are included within the projector field of coverage 135, such that the projector calibration devices can receive projector calibration images from projector 130. In one embodiment, projector calibration devices 165 are co-located with camera calibration devices 160. In another embodiment, projector calibration devices 165 are integrated with camera calibration devices 160. FIG. 1, view A-A, depicts four projector calibration devices 165, however, in various embodiments, visual-collaborative system 100 includes at least one projector calibration device.

Projector field of coverage 135 corresponds to the peripheral edge of 149 of display screen 140. However, only the portion of a projected image that lies in the viewable "active" area 180 is viewable from the second surface 147. The active area 180 is the portion of the display screen within the interior perimeter of bezel 170. Thus, bezel 170 can block a peripheral portion of the projector field of coverage 135. In one embodiment, projector calibration devices 165 are light sensors (e.g., photodiodes).

Projector calibration devices 165 have known coordinates relative to surface 145. For example, the four projector calibration devices 165 depicted in FIG. 1 have known coordinates $xs_1$, $xs_2$, $xs_3$ and $xs_4$, respectively, relative to surface 145. If system 100 included only one projector calibration device 165, then the single projector calibration device would have a known coordinate $xs_1$ relative to surface 145.

Each projection calibration device 165 receives a projector calibration image from projector 130. The projector calibration image received, respectively, by each calibration device 165 is subsequently processed and the location of each projection calibration device 165 is located relative to the projector field of coverage 135.

In one embodiment, the projector calibration image is plurality of binary light patterns. A projected image within the projector field of coverage 135 includes numerous pixels. Each pixel in the field of coverage 135 has a location (xp). A plurality of pixel or every pixel is assigned a unique number and the unique number is subsequently encoded into a binary number. The binary number (unique to the plurality of pixels or every pixel) is projected in sequence onto the display screen 140. In other words, every binary number is projected (patterns of on/off) onto display screen 140. Each projector calibration sensor 165 receives the sequence of projected binary numbers and the binary numbers are subsequently converted back into the pixel number associated with an individual pixel.

For example, a binary light pattern of a pixel corresponding to pixel location $xp_1$ is received by projector calibration sensor 165 at location $xs_1$, a binary light pattern of a pixel corresponding to pixel location $xp_2$ is received by projector calibration sensor 165 at location $xs_2$, a binary light pattern of a pixel corresponding to pixel location $xp_3$ is received by projector calibration sensor 165 at location $xs_3$ and a binary light pattern of a pixel corresponding to pixel location $xp_4$ is received by projector calibration sensor 165 at location $xs_4$.

Thus, by knowing the coordinates of the projector calibration devices 165 relative to surface 145, the coordinate system of the display screen 140 can be calibrated by transformation Hps (transformation from the projector coordinate system to the screen coordinate system), where "p" is in reference to projector 130 and "s" is in reference to display screen 140.

Accordingly, transformation Hpc (transformation from the projector coordinate system to the camera coordinate system) can be known via Hps and Hsc. For example, the composition of Hps (transformation from the projector coordinate system to the screen coordinate system) followed by the composition Hsc (transformation from the screen coordinate system to the camera coordinate system) provides for transformation Hpc. The three coordinate system (i.e., projector, camera and screen) are related to each other because of the determined Hpc, Hps and Hsc.

Co-locating or integrating the camera calibration devices 160 and projector calibration devices 165 can improve the robustness to assembly error. For example, if the calibration devices 160 and 165 are not correctly installed in the precise location, the co-location will at least bring the camera 120 and projector 130 into correspondence. Even if the correspondence does not align with a known coordinate on a surface of the display screen 140.

In another embodiment, camera calibration devices 160 and projector calibration devices 165 are integrated into modules (e.g., receiver/emitter pair) that act as converters. For example, a projection calibration image (that camera 120 cannot see) is received from projector 130 and a corresponding signal (that camera 120 can see) is emitted to camera 120. In another example, if the camera and projector are protected from each other by wavelength-division filters, the integrated calibration devices 160 and 165 can be repeaters that shift the frequency of the projection calibration image such that camera 120 can receive a viewable image. In a further embodiment, only a particular pattern may be repeated in order to prevent accidental triggering during operation.

Calibration between the projector and camera (e.g., Hpc) can also be accomplished by configuring the system so that the camera is able to sense light from the projector over a limited area, for example an area included within the bezel 170. This can be achieved by configuring camera filter A and/or projector filter B to cover only the active area 180. For example, filter A or B can have a clear area (that does not filter) that corresponds to the bezel 170. With the system so configured, calibration can be achieved by having the projector project a known light pattern onto the bezel 170 (e.g., a pseudo-random pattern) and the camera can sense this pattern and compute the homography Hpc. Typically, the interior surface of the bezel is customarily black in color to help control scattered light. For purposes of calibration, at least parts of the interior surface of the bezel (e.g., the four corners) are colored white. This increases the amount of reflected light and enables the camera to better sense the calibration pattern emitted from the projector.

In another embodiment, filter A and/or B are selectively disabled during calibration. For example, filter A and/or B can be mechanically removed or electrically suppressed. In one embodiment, to find Hpc, camera filter A is mechanically flipped out of the light path of the camera. Alternatively, filter A is an electrically adjustable filter such as a liquid crystal tunable filter, and prior to calibration filter A is re-tuned to allow light from the projector to pass. In either case, the projector emits a known calibration pattern onto either the bezel 170 or the active area 180. The camera senses the pattern and the system computes the homography Hpc. After the calibration measurement, filter A is restored to its original state.

In an additional embodiment, a patch of material (e.g., rubies, phosphorescent material, etc.) is applied behind the bezel 170 that changes the frequency of the incident light, so that the projected light is frequency shifted into a band visible to camera 120. In yet another embodiment, any material that does not preserve polarization can be used such that a projected calibration image is visible by camera 120.

A user may be employed to facilitate in the calibration of visual-collaborative system 100. In one embodiment, at a first step, a projector 130 projects a calibration mark (e.g., crosshairs) onto the first surface 145 of display screen 140, from a location xp in the projector's coordinate system. At a second step, the user then touches the apparent position of the projected calibration mark at location xs. At a third step, camera 120 detects the finger position xc. In an alternative embodiment, at the second step, if a touch sensing system is used (e.g., camera 190), a touch is registered at xt. In an alternative embodiment, at the third step, a small easily detectable target (e.g., checker board, pseudo-random pattern) is held over the calibration mark by the user. This is done because the target is easier to detect and more accurately located than a fingertip. The user can further assist the calibration system by indicating when the target is ready for reading. For example, by touching the display screen 140 elsewhere (e.g., on a large "ready" target), or by using some associated input device (e.g., mouse, keyboard).

In another embodiment, at a first step, a projector 130 projects a calibration mark onto the first surface 145 of display screen 140, at a location xp. At a second step, the user then touches the apparent position of the projected calibration mark on the second surface 147 of display screen 140, at location xs. At a third step, camera 120 takes a still picture of the user at the moment of touch. At a fourth step, the image is projected onto display screen 140 using a nominal transformation (e.g., an identity transformation H'cp). At a fifth step, the user touches the apparent location of their own projected fingertip.

It should be appreciated that the user assisted calibration steps, as described above, can be repeated four times, to give four sets of corresponding points (e.g., (xp, xc) or (xp, xc, xt)). If the touch system is precalibrated with a known transformation Hst, then the remaining coordinates systems (e.g., projector and camera) can be brought into correspondence with absolute surface coordinates.

In various embodiments of the present invention, calibration is performed only once at the time the visual-collaborative system 100 is assembled. In another embodiment, the calibration of visual-collaborative system 100 is performed frequently (e.g., each time the visual-collaborative system 100 is turned on).

Method of Calibration

Figure 2:
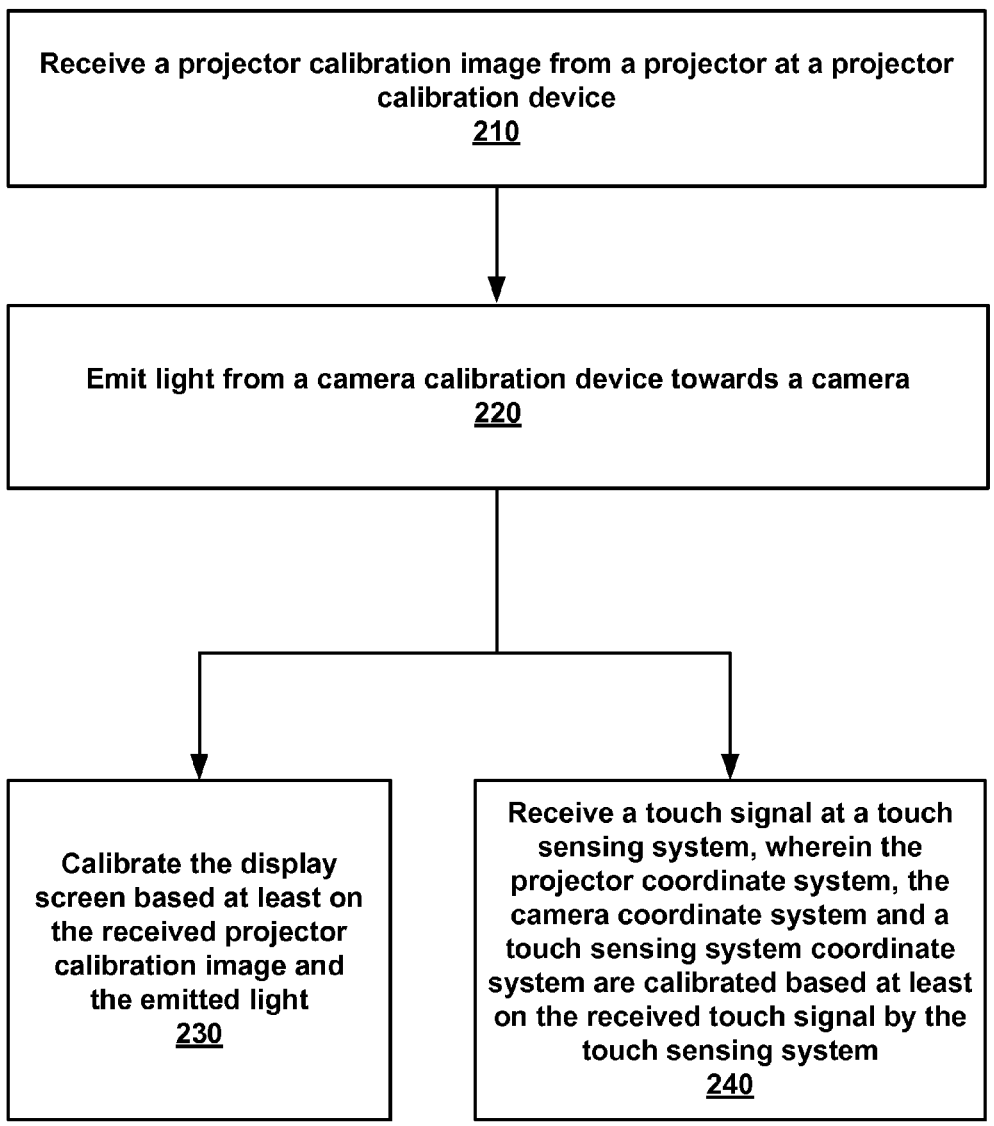
FIG. 2 illustrates an example of a flow chart of a method for calibration, in accordance with an embodiment of the present invention.

FIG. 2 illustrates a flow chart of a method 200 for calibration, in accordance with an embodiment of the present invention. In one embodiment, method 200 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 200 is performed at least by the system of FIG. 1.

At step 210, a projector calibration image is received from a projector at a projector calibration device. In one embodiment, the projector calibration device is a light sensor disposed at a known coordinate relative and proximate to the display screen. In another embodiment, the projector calibration image is a plurality of binary light patterns associated with each pixel in a field of coverage of the projector.

At step 220, light is emitted from a camera calibration device towards a camera. In one embodiment, the camera calibration device is a light source (e.g., LED) disposed at a known coordinate relative and proximate to the display screen. In another embodiment, the camera calibration device and the projector calibration device are integrated into a light receiver/emitter device configured to receive the projector calibration image in a first frequency and emit light in a second frequency towards the camera. The light receiver/emitter is disposed at a known coordinate proximate and relative to the display screen.

At step 230, the display screen is calibrated based at least on the received projector calibration image and the emitted light.

At step 240, a touch signal is received at a touch sensing system, wherein the projector coordinate system, the camera coordinate system and a touch sensing system coordinate system are calibrated based at least on the received touch signal by the touch sensing system.

Various embodiments of the present invention are thus described. While the present invention has been described in particular embodiments, it should be appreciated that the present invention should not be construed as limited by such embodiments, but rather construed according to the following claims.

What is claimed is:

1. A calibration system comprising:
a display screen comprising a first surface and a second surface;
a projector configured to project an image onto said first surface of the display screen and said image is viewable on said second surface of said display screen, wherein said projector comprises a projector coordinate system;
a camera configured to capture an image of an object through said display screen, wherein said camera comprises a camera coordinate system; and
a calibration device configured to calibrate said display screen.

2. The system of claim 1, wherein said calibration device comprises:
   a light source configured to emit light towards said camera, wherein said light source is disposed at a known coordinate proximate and relative to said display screen.

3. The system of claim 1, wherein said calibration device comprises:
   a light sensor configured to receive projector calibration images from said projector, wherein said light sensor is disposed at a known coordinate proximate and relative to said display screen.

4. The system of claim 3, wherein said projector calibration images comprise:
   binary light patterns associated with a plurality of pixels in a field of coverage of said projector.

5. The system of claim 1, comprising:
   a touch sensing system configured to sense a location of a touch pressure on said display screen, wherein said touch sensing system comprises a touch coordinate system and wherein said projector coordinate system, said camera coordinate system and said touch coordinate system are calibrated based at least on said location of said touch pressure on said second surface of said display screen.

6. The system of claim 1, wherein said calibration device is disposed proximate to said display screen.

7. A method for calibration, said method comprising:
   receiving a projector calibration image from a projector at a projector calibration device, wherein said prosector is configured to project an image onto a first surface of a display screen and said image is viewable on a second surface of said display screen;
   emitting light from a camera calibration device towards a camera, wherein said camera is configured to capture an image through said display screen; and
   calibrating said display screen based at least on said received projector calibration image and said emitted light.

8. The method of claim 7, wherein said projector calibration device, comprises:
   a light sensor disposed proximate to said display screen and at a known coordinate relative to said display screen.

9. The method of claim 7, wherein said camera calibration device, comprises:
   a light source disposed proximate to said display screen and at a known coordinate relative to said display screen.

10. The method of claim 9, wherein said projection calibration image comprises:
    binary light patterns associated with each pixel in a field of coverage of said projector.

11. The method of claim 7, comprising:
    receiving a touch signal at a touch sensing system, wherein said projector coordinate system, said camera coordinate system and a touch sensing system coordinate system are calibrated based at least on said received touch signal by said touch sensing system.

12. The method of claim 7, wherein said projector calibration device and said camera calibration device combined, comprise:
    a light receiver/emitter device configured to receive said projector calibration image in a first frequency and emit light in a second frequency towards said camera, wherein said light receiver/emitter is disposed at a known coordinate proximate and relative to said display screen.

13. A calibration system comprising:
    a projector configured to project an image onto a first surface of a display screen and a calibration surface, wherein said projector comprises a projector coordinate system, and wherein said image projected onto said first surface of said display screen is viewable on a second surface of said display screen; and
    a camera configured to capture said image through said display screen and on said calibration surface such that a camera coordinate system and said projector coordinate system are calibrated.

14. The system of claim 13, wherein said calibration surface is disposed on a perimeter of said display surface.

15. The system of claim 13, comprising:
    a housing, wherein said projector, said camera and said calibration surface are disposed in said housing.

16. The system of claim 13, comprising:
    a filter configured to block said image projected on said display screen from said camera.

17. The system of claim 13, comprising:
    a filter configured to pass light received by said camera and substantially block said image produced by said projector.

18. The system of claim 17, wherein said filter is temporarily disabled such that said camera coordinate system and said projector coordinate system are calibrated.

19. The system of claim 17, wherein said filter comprises:
    an electrically adjustable filter such that said image produced by said projector is captured by said camera such that said camera coordinate system and said projector coordinate system are calibrated.

\* \* \* \* \*

UNITED STATES PATENT AND TRADEMARK OFFICE
CERTIFICATE OF CORRECTION

| | | |
|---|---|---|
| PATENT NO. | : 8,542,267 B1 | Page 1 of 1 |
| APPLICATION NO. | : 12/571529 | |
| DATED | : September 24, 2013 | |
| INVENTOR(S) | : Mitchell Trott et al. | |

It is certified that error appears in the above-identified patent and that said Letters Patent is hereby corrected as shown below:

In the Claims

In column 9, line 30, in Claim 7, delete "prosector" and insert -- projector --, therefor.

Signed and Sealed this
Eleventh Day of March, 2014

Michelle K. Lee
*Deputy Director of the United States Patent and Trademark Office*